United States Patent
Mortensen

(10) Patent No.: US 12,287,537 B2
(45) Date of Patent: Apr. 29, 2025

(54) TRAVELING WAVE CASCADED MICRO RING MODULATORS

(71) Applicant: Mellanox Technologies, Ltd., Yokneam (IL)

(72) Inventor: Anders Svava Mortensen, Store Heddinge (DK)

(73) Assignee: Mellanox Technologies, Ltd., Yokneam (IL)

( * ) Notice: Subject to any disclaimer, the term of this patent is extended or adjusted under 35 U.S.C. 154(b) by 301 days.

(21) Appl. No.: 17/993,296

(22) Filed: Nov. 23, 2022

(65) Prior Publication Data

US 2024/0168319 A1    May 23, 2024

(51) Int. Cl.
G02F 1/01    (2006.01)

(52) U.S. Cl.
CPC ............ G02F 1/0121 (2013.01); G02F 1/011 (2013.01)

(58) Field of Classification Search
None
See application file for complete search history.

(56) References Cited

U.S. PATENT DOCUMENTS

| | | |
|---|---|---|
| 6,345,131 B1 | 2/2002 | Jang |
| 7,409,123 B1 | 8/2008 | Feng |
| 7,542,641 B1 | 6/2009 | Asghari |
| 7,658,552 B2 | 2/2010 | Asghari |
| 7,917,035 B2 | 3/2011 | Asghari |
| 8,090,231 B1 | 1/2012 | Asghari |
| 8,160,404 B2 | 4/2012 | Pan |
| 8,242,432 B2 | 8/2012 | Feng |
| 8,346,028 B2 | 1/2013 | Feng |
| 8,411,260 B1 | 4/2013 | Feng |
| 8,463,088 B1 | 6/2013 | Asghari |
| 8,476,576 B2 | 7/2013 | Dong |
| 8,526,769 B1 | 9/2013 | Feng |
| 8,638,485 B2 | 1/2014 | Feng |
| 8,724,100 B1 | 5/2014 | Asghari |

(Continued)

FOREIGN PATENT DOCUMENTS

WO    2022200292 A1    9/2022

OTHER PUBLICATIONS

Ackermann, M. et al., "Sub-wavelength tunneling barrier in rib waveguide microring modulators with vanishing bending losses," Opt. Lett. 47, 2626-2629 (2022).

(Continued)

*Primary Examiner* — Jerry Rahll
(74) *Attorney, Agent, or Firm* — Anup Iyer; Moore & Van Allen PLLC

(57) ABSTRACT

Traveling wave cascaded micro ring modulators (TW-CMRMs) are provided. An example TW-CMRM includes an optical bus, an electrical transmission line, and at least two micro ring modulators (MRMs) operatively coupled to the optical bus and the electrical transmission line. The electrical transmission line includes a cathode transmission line and an anode transmission line. The at least two MRMs are cascaded in a series connection, and the at least two cascaded MRMs include a first terminal and a second terminal respectively. The at least two cascaded MRMs collectively modulate a phase and/or an amplitude of an optical input signal received from an optical signal source.

19 Claims, 13 Drawing Sheets

(56) References Cited

U.S. PATENT DOCUMENTS

| | | | |
|---|---|---|---|
| 8,728,837 | B2 | 5/2014 | Fong |
| 8,737,772 | B2 | 5/2014 | Dong |
| 8,817,354 | B2 | 8/2014 | Feng |
| 8,897,606 | B2 | 11/2014 | Asghari |
| 8,965,208 | B2 | 2/2015 | Asghari |
| 8,989,522 | B2 | 3/2015 | Qian |
| 9,025,241 | B2 | 5/2015 | Asghari |
| 9,142,698 | B1 | 9/2015 | Cunningham |
| 9,217,831 | B1 | 12/2015 | Asghari |
| 9,217,836 | B2 | 12/2015 | Asghari |
| 9,244,327 | B2 | 1/2016 | Prosyk |
| 9,274,353 | B1 | 3/2016 | Dong |
| 9,279,936 | B2 | 3/2016 | Qian |
| 9,312,960 | B1 | 4/2016 | Feng |
| 9,379,515 | B1 | 6/2016 | Asghari |
| 9,588,294 | B2 | 3/2017 | Fong |
| 9,702,278 | B2 | 7/2017 | Gruener |
| 9,798,166 | B1 | 10/2017 | Sharma |
| 9,966,733 | B2 | 5/2018 | Feng |
| 9,991,965 | B2 | 6/2018 | Christensen |
| 10,031,355 | B2 | 7/2018 | Feng |
| 10,078,232 | B1 | 9/2018 | Vermeulen |
| 10,288,805 | B2 | 5/2019 | Luff |
| 10,330,864 | B2 | 6/2019 | Asghari |
| 10,394,060 | B2 | 8/2019 | Mentovich |
| 10,409,135 | B2* | 9/2019 | Zid .................. G02F 1/0147 |
| 10,649,244 | B1 | 5/2020 | Mentovich |
| 10,651,933 | B1* | 5/2020 | Chiang ............. H04B 10/0795 |
| 10,895,797 | B2 | 1/2021 | Cavaliere |
| 11,397,363 | B2 | 7/2022 | Kawakami |
| 2010/0330727 | A1 | 12/2010 | Hill |
| 2012/0251029 | A1 | 10/2012 | Kobrinsky |
| 2013/0044973 | A1* | 2/2013 | Akiyama ............. G02F 1/0121 |
| | | | 385/2 |
| 2013/0182305 | A1 | 7/2013 | Feng |
| 2015/0010263 | A1 | 1/2015 | Fong |
| 2015/0055911 | A1 | 2/2015 | Bowers |
| 2015/0261061 | A1* | 9/2015 | Akiyama ........... G02B 6/29391 |
| | | | 385/2 |
| 2017/0149508 | A1* | 5/2017 | Baehr-Jones ......... G02F 1/3132 |
| 2017/0269391 | A1 | 9/2017 | Feng |
| 2017/0351124 | A1 | 12/2017 | Roth |
| 2018/0031946 | A1* | 2/2018 | Middlebrook ........ H04B 10/505 |
| 2018/0314128 | A1 | 11/2018 | Sun |
| 2019/0179177 | A1 | 6/2019 | Rickman |
| 2019/0293971 | A1 | 9/2019 | Yu |
| 2019/0324345 | A1* | 10/2019 | Vera Villarroel ..... G02F 1/2255 |
| 2020/0012043 | A1 | 1/2020 | Abediasl |
| 2020/0124878 | A1 | 4/2020 | Yu |
| 2021/0191164 | A1 | 6/2021 | Mentovich |
| 2021/0194586 | A1* | 6/2021 | Middlebrook ... H04B 10/25759 |
| 2021/0336418 | A1 | 10/2021 | Lakovlev |
| 2022/0182149 | A1* | 6/2022 | Kim ..................... H04B 10/504 |
| 2022/0236619 | A1 | 7/2022 | Hoessbacher |
| 2022/0337321 | A1 | 10/2022 | Argyris |
| 2023/0018578 | A1 | 1/2023 | Bakopoulos |

OTHER PUBLICATIONS

Akiyama, S. et al. "Cascaded-ring-resonator-loaded Mach-Zehnder modulator for enhanced modulation efficiency in wide optical bandwith," Opt. Expr. 20, 16321-16338 (2012).

Akiyama, Suguru et al. "InP-Based Mach-Zehnder Modulator With Capacitively Loaded Travelling-Wave Electrodes," Journal of Lightwave Technology, vol. 26, No. 5, Mar. 1, 2008, pp. 608-615, DOI: 10.1109/JLT.2007.915278.

Bin Wang et al. (2022), "Principles of Selective Area Epitaxy and Applications in III-V Semiconductor Lasers Using MOCVD: A Review," Crystals 2022, 12(7), 1011.

Chacinski, Marck et al. "Monolithically Integrated 100 GHz DFB-TWEAM," Journal of Lightwave Technology, vol. 27, No. 16, Aug. 15, 2009, pp. 3410-3415, DOI: 10.1109/JLT.2009.2015773. Available online: URL: https://opg.optica.org/jlt/abstract.cfmuri=jlt-27-16-3410.

Cui, Yansong et al. "Modeling and Design of GaAs Traveling-Wave electrooptic Modulators Based on Capacitively Loaded Coplanar Strips," Journal of Lightwave Technology, vol. 24, No. 1, Jan. 2006, pp. 544-554, DOI: 10.1109/JLT.2005.859851.

D. A. B. Miller et al. (1984), "Band-Edge Electroabsorption in Quantum Well Structures: The Quantum-Confined Stark Effect," Phys. Rev. Lett. 53, 2173.

Han, C. et al., "Recent progress in silicon-based slow-light electro-optic modulators," Micromachines 13, 400 (2022).

Han, C. et al., "Ultra-compact silicon modulator with 110 GHz bandwith," in Proc. Opt. Fib. Comm. Conf. (OFC), (Optica Publishing Group, Washington, D.C. 2022), p. Th4C.5.

Horikawa, T. et al., "A 300-nm silicon photonics platform for large-scale device integration," J. Sel. Top. Quant. Electron, 24, 8200415 (2018).

Hou et al. (2010), "Monolithic 40 GHz passively Mode-locked AlGaInAs/InP 1.55 mm MQW Laser with Surface-etched Bragg Gratings," European Conference on Integrated Optics (ECIO 10).

J. Yan, T. Yeh, Y. Chang, Y. Wu, and K. Feng, "DSP Equalization-free Data Center Communication with High Dispersion Tolerant Optical Duobinary-PAM4 Signal," in Conference on Lasers and Electro-Optics, OSA Technical Digest (online) (Optical Society of America, 2017), paper SF1L.4.

Jafari, O. et al., "Mach-Zehnder silicon photonic modulator assisted by phase-shifted bragg gratings," Photon. Technol. Lett. 32, 445-448 (2020).

K. Yonenaga and S. Kuwano, "Dispersion-Tolerant Optical Transmission System Using Duobinary Transmitter and Binary Receiver," IEEE J. Lightwave Technol., vol. 15, No. 8, pp. 1530-1537, 1997.

Klein, H.N. et al. "1.55μm Mach-Zehnder Modulators on InP for Optical 40/80 Gbit/s Transmission Networks," In 2006 International Conference on Indium Phosphide and Related Materials Conference Proceedings, May 8, 2006, pp. 171-173, IEEE.

Lange, Sophie et al. "100 GBd Intensity Modulation and Direct Detection With an InP-Based Monolithic DFB Laser Mach-Zehnder Modulator," Journal of Lightwave Technology, vol. 36, No. 1, Jan. 1, 2018, pp. 97-102.

Lange, Sophie et al. "Low Switching Voltage Mach-Zehnder Modulator Monolithically Integrated With DFB Laser for Data Transmission Up to 107.4 GB/s," Journal of Lightwave Technology, vol. 34, No. 2, Jan. 15, 2016, pp. 401-406, DOI: 10.1109/JLT.2015.2496426.

Li, G.L. et al. "Analysis of Segmented Traveling-Wave Optical Modulators," Journal of Lightwave Technology, vol. 22, No. 7, Jul. 2004, pp. 1789-1796, DOI: 10.1109/JLT.2004.831179. Available online: URL: https://opg.optica.org/jlt/abstract.cfmuri=jlt-22-7-1789.

Li, G.L. et al. "Numerical Modeling of Segmented Traveling-Wave Electroabsorption Modulators," In 2004 IEE MTIT-S International Microwave Symposium Digest (IEEE Cat. No. 04CH37535), Jun. 6, 2004, vol. 2, pp. 773-776, IEEE.

Margalit, N. et al., "Perspectives on the future of silicon photonics and electronics," Appl. Phys. Lett. 118, 220501 (2021).

Nakai, Y. et al. (2019), "Uncooled Operation of 53-GBd PAM4 (106-GB/s) EA/DFB Lasers With Extremely Low Drive Voltage With 0.9 Vpp," Journal of Lightwave Technology, vol. 37, Issue 7, pp. 1658-1662.

Nan Qi et al., Co-Design and Demonstration of a 25 Gbps Silicon-Photonic Mach Zehnder Modulator with a CMOS Based High Swing Driver, IEEE, Nov. 2016, pp. 1-11 (Year: 2016).

Ogiso, Yoshihiro et al. "Over 67 GHZ Bandwidth and 1.5 V Vp InP-Based Optical IQ Modulator With n-i-p-n Heterostructure," Journal of Lightwave Technology, vol. 35, No. 8, Apr. 15, 2017, pp. 1450-1455, DOI: 10.1109/JLT.2016.2639542.

Qian, Guang et al. "CL-TWE Mach-Zehnder Electro-Optic Modulator Based on InP-MQW Optical Waveguides," Chinese Optics Letters, vol. 17, No. 6, Jun. 2019, pp. 061301-1-061301-5, DOI: 10.3788/COL201917.061301.

Romero-Garcia, Sebastian et al., "High-speed resonantly enhanced silicon photonics modulator with a large operating temperature range", Optic Letters, vol. 42, Issue 1, pp. 81-84 (2017). https://doi.org/10.1364/OL.42.000081.

(56) References Cited

OTHER PUBLICATIONS

Sharif Azadeh, S. et al., "Low Vp silicon photonics modulators with highly linear epitaxially grown phase shifters," Opt. Expr. 23, 23526-23550 (2015).
Stepanenko, M. et al. "Optimization of RF Electrodes For Electro-Optic Modulator Based on Quantum-Confined Stark Effect," In Journal of Physics: Conference Series 2019, vol. 1145, No. 1:012028, pp. 1-6, IOP Publishing.
Stepanenko, Mikhail et al. "Multi-Parameter Optimization of an InP Electro-Optic Modulator," Symmetry, vol. 12, Nov. 21, 2020, pp. 1-18, DOI: 10.3390/sym12111920.
Tamura, M. et al. (2003), "High-speed electroabsorption modulators using ruthenium-doped SI-InP: impact of interdiffusion-free burying technology on E/O modulation characteristics," International Conference on Indium Phosphide and Related Materials, 2003. pp. 491-494.
Terada, Y. et al., "Full C-band Si photonic crystal waveguide modulator," Opt. Lett. 42, 5110-5112 (2017).
U.S. Appl. No. 17/644,625, filed Dec. 16, 2021, entitled "High Bandwidth Optical Modulator".
U.S. Appl. No. 17/694,159, filed Mar. 14, 2022, entitled "Serial Data Conversion Redundacy Using Optical Modulators".
U.S. Appl. No. 17/810,068, filed Jun. 30, 2022, entitled "High Bandwidth Travelling Wave Electro Absorption Modulator (EAM) Chip".
U.S. Appl. No. 18/110,206, filed Feb. 15, 2023, entitled "System for In-Band Spectral Cross-Talk Monitoring".
U.S. Appl. No. 18/120,719, filed Mar. 13, 2023, entitled "Differential Traveling Wave Electro-Absorption Modulator for High Bandwidth Operation".
U.S. Appl. No. 18/120,802, filed Mar. 13, 2023, entitled "Low Voltage Traveling Wave Electro-Absorption Modulator for High Bandwidth Operation".
U.S. Appl. No. 63/266,527, filed Jan. 7, 2022, entitled "High Bandwidth Travelling Wave Electro Absorption Modulator (EAM) Chip".
Velthaus, K.-O. et al. "High Performance InP-Based Mach-Zehnder Modulators for 10 to 100 Gb/s Optical Fiber Transmission Systems," 23rd International Conference on Indium Phosphide and Related Materials—IPRM 2011, May 22-26, 2011, (4 pages), Berlin, Germany.
Wang, Gary et al. "Low Vp, High Bandwidth, Small Form Factor InP Modulator," in 2014 IEEE Avionics, Fiber-Optics and Photonics Technology Conference (AVFOP), Nov. 11, 2014, pp. 41-42, IEEE.
Witzens, J., "High-Speed silicon photonics modulators," Proc. IEEE 106, 2158-2182 (2017).
Yamazaki, Hiroshi et al. "IMDD Transmission at Net Data Rate of 333 GB/s Using Over-100-GHz-Bandwidth Analog Multiplexer and Mach-Zehnder Modulator," Journal of Lightwave Technology, vol. 37, No. 8, Apr. 15, 2019, pp. 1772-1778, DOI: 10.1109/JLT.2019.2898675.

* cited by examiner

TRAVELING WAVE CASCADED MICRO RING MODULATORS

TECHNOLOGICAL FIELD

Example embodiments of the present disclosure relate generally to photonic components in optical communications and, more particularly, to the use of a traveling wave micro ring modulator (TW-CMRM) for optical signal modulation.

BACKGROUND

Electro-optical (EO) modulators generally refer to optical devices in which a signal-controlled element that exhibits an electro-optic effect is used to modulate an optical signal. EO modulators, such as micro ring modulators (MRMs), are leveraged by optical communication and often dictate the achievable transmission rate. Applicant has identified a number of deficiencies associated with optical signal modulation techniques and systems. Through applied effort, ingenuity, and innovation, many of these identified problems have been solved by developing solutions that are included in embodiments of the present disclosure, many examples of which are described in detail herein.

BRIEF SUMMARY

Embodiments of the present disclosure are directed to traveling wave cascaded micro ring modulators (TW-CMRMs) and associated methods of optical signal modulation. An example traveling wave cascaded micro ring modulator (TW-CMRM) is provided. The modulator may include an optical transmission line and an electrical transmission line. The electrical transmission line may include a cathode transmission line and an anode transmission line. The modulator may also include at least two micro ring modulators (MRMs) operatively coupled to the optical transmission line and the electrical transmission line. The at least two MRMs may be cascaded in a series connection and may include a first terminal and a second terminal respectively. The at least two cascaded MRMs may be collectively configured to modulate a phase and/or an amplitude of an optical input signal received from an optical signal source.

In some embodiments, the electrical transmission line may relay an electrical input signal to the at least two MRMs.

In some embodiments, the electrical transmission line may regulate the electrical input signal by introducing a delay that is proportional to an optical delay associated with the optical transmission line.

In some embodiments, the modulator may further include a level-shifting circuit operatively coupled to the at least two MRMs and the electrical transmission line.

In some embodiments, the level-shifting circuit may be a direct current (DC) driver circuit.

In some embodiments, the level-shifting circuit may be an alternating current (AC) driver circuit.

In some embodiments, the level-shifting circuit may be a low frequency (LF) driver circuit.

In some embodiments, the first terminal of the at least two MRMs may operatively be coupled to the anode transmission line, and the second terminal of the at least two MRMs may operatively be coupled to the cathode transmission line.

In some embodiments, the cathode transmission line and the anode transmission line may include a first characteristic impedance differential therebetween.

In some embodiments, the first characteristic impedance may be in a range between approximately 500 and approximately 1000.

In some embodiments, the first terminal of the at least two MRMs may operatively be coupled to a first reference voltage, and the second terminal of the at least two MRMs may operatively be coupled to the cathode transmission line.

In some embodiments, the cathode transmission line and the first reference voltage may include a second characteristic impedance differential therebetween.

In some embodiments, the second characteristic impedance may be in a range between approximately 200 and approximately 500.

In some embodiments, the first terminal of the at least two MRMs may operatively be coupled to the anode transmission line, and the second terminal of the at least two MRMs may operatively be coupled to a second reference voltage.

In some embodiments, the anode transmission line and the second reference voltage may include a third characteristic impedance differential therebetween.

In some embodiments, the third characteristic impedance may be in a range between approximately 20Ω and approximately 50Ω.

In some embodiments, the at least two MRMs may be substantially identical.

In some embodiments, the at least two MRMs may not be substantially identical.

A method for modulating an optical signal using a traveling wave cascaded micro ring modulator (TW-CMRM) is also provided. The method may include receiving, from an optical signal source, an optical input signal via an optical transmission line, wherein the optical transmission line is operatively coupled to at least two micro ring modulators (MRMs), wherein the at least two MRMs are cascaded in a series connection. The method may further include receiving, from an electrical signal source, an electrical input signal via an electrical transmission line modulating, via the at least two cascaded MRMs, the optical input signal, and generating a modulated optical signal by modulating the optical input signal. The method may then include transmitting the modulated optical signal as optical output signal via the optical transmission line.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1A:
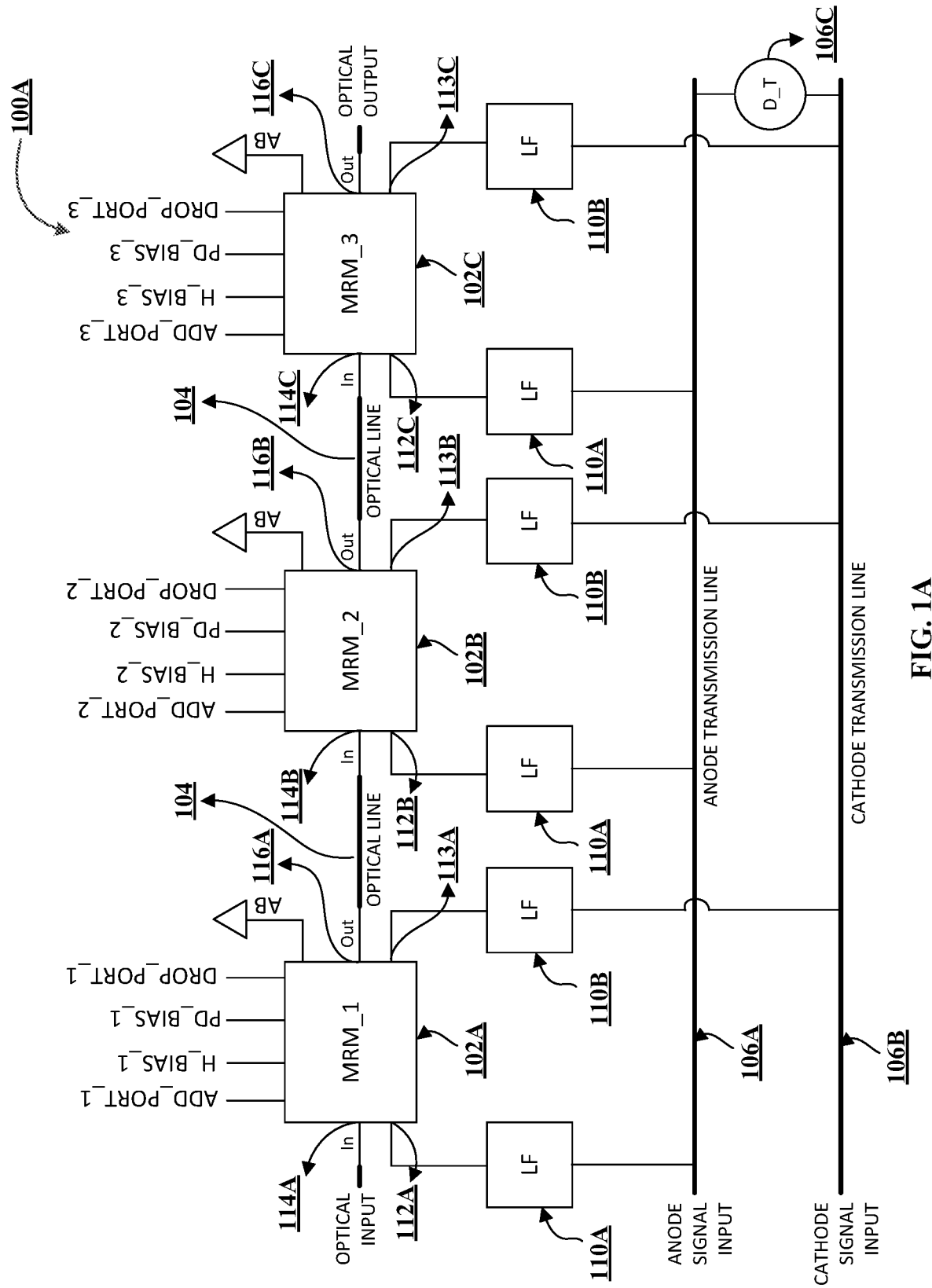
FIGS. 1A-1D illustrate a differential implementation of a traveling wave cascaded micro ring modulator (TW-CMRM), in accordance with one or more embodiments of the present disclosure.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically coupled and/or are in electrical communication with one another, or optically coupled and/or are in optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

It should be understood that the word "exemplary" is used herein to mean "serving as an example, instance, or illustration." Any implementation described herein as "exemplary" is not necessarily to be construed as advantageous over other implementations.

Furthermore, as would be evident to one of ordinary skill in the art in light of the present disclosure, the terms "substantially" and "approximately" indicate that the referenced element or associated description is accurate to within applicable engineering tolerances.

As described above, electro-optical (EO) modulators generally refer to optical devices in which a signal-controlled element that exhibits an electro-optic effect is used to modulate an optical signal. EO modulators, such as micro ring modulators (MRMs), are key components in short-range optical interconnects due to their low operating voltage, compact size, and compatibility with complementary metal-oxide semiconductor (CMOS) circuit drivers. EO modulators may be used to control the amplitude, phase, and/or polarization state of an optical signal electrically. As such, EO modulators are an indispensable part of optical communication systems, largely dictating the achievable transmission rate.

Conventional modulation techniques and implementations often have to fail to generate sufficient launch power without being driven by a pre-driver circuit. In order to solve this problem and others, embodiments of the present disclosure introduce a method for modulating an optical signal using a traveling wave cascaded micro ring modulator (TW-CMRM). An example TW-CMRM includes multiple (two or more) MRMs that are cascaded in a series connection, whereby the output of the first MRM is connect to the input of the second MRM and so on. By cascading the MRMs with one another, the TW-CMRM may achieve increased launch power while maintaining a lower bias and increasing overall modulation efficiency not found in traditional modulation implementations. Each MRM in the TW-CMRM is connected to an optical transmission line and is driven by electrical input signals relayed via an electrical transmission line (e.g., cathode transmission line and anode transmission line). The TW-CMRM may have various configurations including at least a differentially driven configuration and a single ended configuration.

In a differentially driven configuration, the TW-CMRM may be driven by a level-shifting circuit connected between the MRMs and the electrical transmission line. The level-shifting circuit may be a direct current (DC) drive, an alternating current (AC) drive, or a low frequency (LF) drive. In the differentially driven configuration, the first terminal of each MRM is connected to the cathode transmission line and the second terminal of each MRM is connected to the anode transmission line, with a characteristic impedance differential (in the range between approximately 50Ω and approximately 100Ω) therebetween. In a single ended configuration, the first terminal of each MRM is connected to a reference voltage and the second terminal of each MRM is connected to either the cathode transmission line or the anode transmission line, with a characteristic impedance differential (in the range between approximately 200 and approximately 50Ω) therebetween.

Example TW-CMRMs

With reference to FIGS. 1A-ID, differential implementations of a traveling wave cascaded micro ring modulator (TW-CMRM) 100A-D are illustrated. As shown in FIGS. 1A-ID, the TW-CMRM may include MRMs 102A, 102B, 102C. In some embodiments, the MRMs may be substantially identical to one another. For example, the MRMs may have identical configuration in terms of Q-factors, center wavelength of resonance, coupling coefficients, voltage bias requirements, and/or the like. In some other embodiments, the MRMs 102A, 102B, 102C may not be substantially identical. For example, the MRMs 102A, 102B, 102C, may be at least partially different in terms of varying Q-factors, which may be used to shape the frequency spectrum of the modulated optical output signal, varying center wavelength of resonance to broaden the frequency response, varying coupling coefficients, varying voltage bias requirements, and/or the like. As would be evident in light of the present disclosure, various operating parameters, characteristics, attributes, etc. of the MRMs 102A, 102B, 102C may be varied based upon the intended application of the TW-CMRM 100A-100D Each MRM 102A, 102B, 102C may include a first optical terminal, a second optical terminal, a first electrical terminal, and a second electrical terminal. For optical signal transmission through each MRM 102A, 102B, 102C, the first optical terminal may be an input terminal while the second optical terminal may be an output terminal. For electrical signal input, the first electrical terminal and the second electrical terminal may both be input terminals. For example, MRM_1 102A may include a first optical terminal 114A, second optical terminal 116A, first electrical terminal 112A, and second electrical terminal 113A, MRM_2 102B may include a first optical terminal 114B, second optical terminal 116B, first electrical terminal 112B, and second electrical terminal 113B, and MRM_3 102C may include a first optical terminal 114C, a second optical terminal 116C, first electrical terminal 112C, and second electrical terminal 113C. The MRMs 102A, 102B, 102C may be cascaded in a series connection such that the output of a first MRM stage is connected to the input of the second MRM stage. By way of a nonlimiting example, the second optical terminal 116A of MRM_1 102A may be connected to the first optical terminal 114B of MRM_2 102B, and the second optical terminal 116B of MRM_2 102B may be connected to the first optical terminal 114C of MRM_3 102C.

Figure 1B:
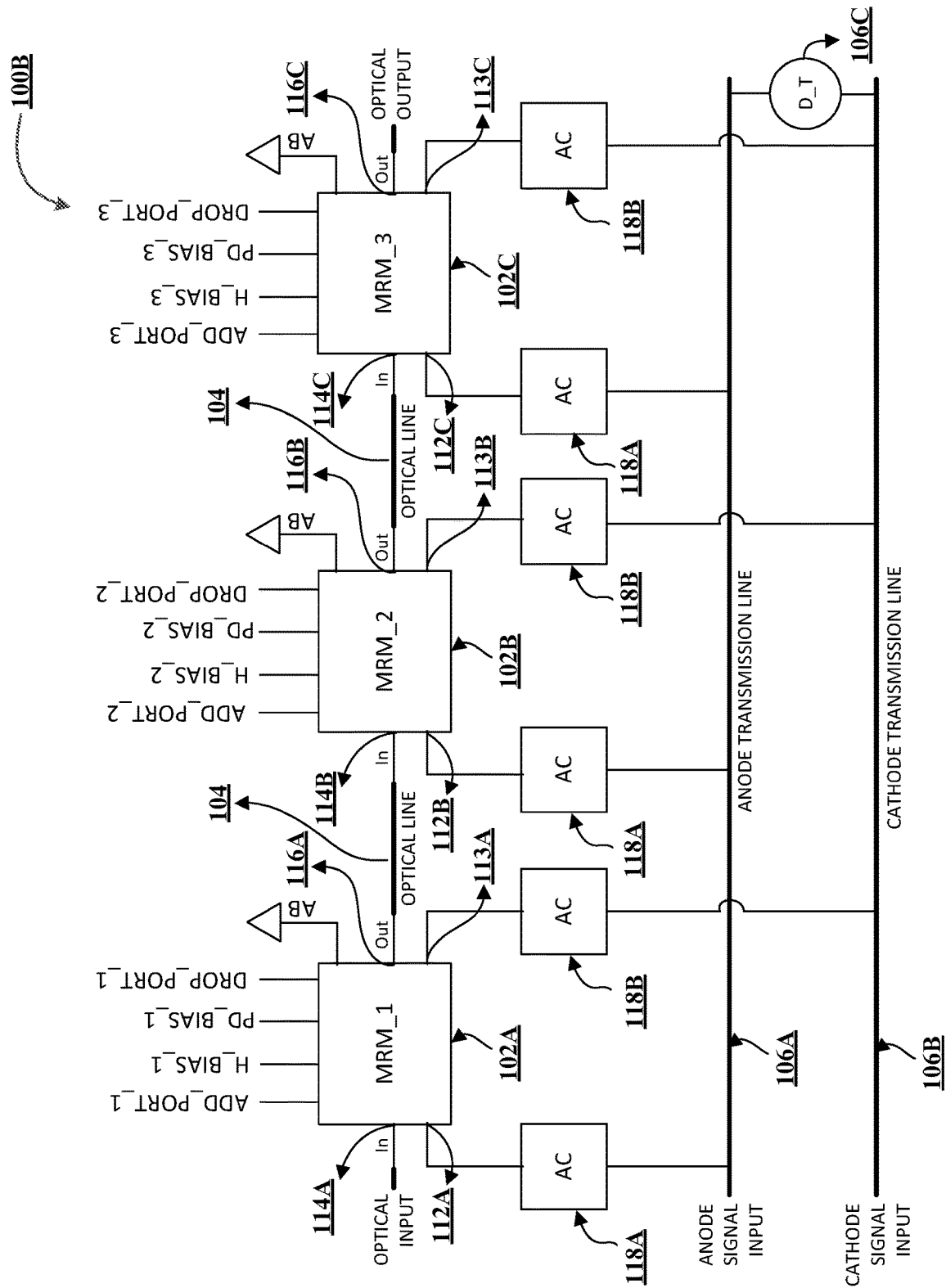
Figure 1C:
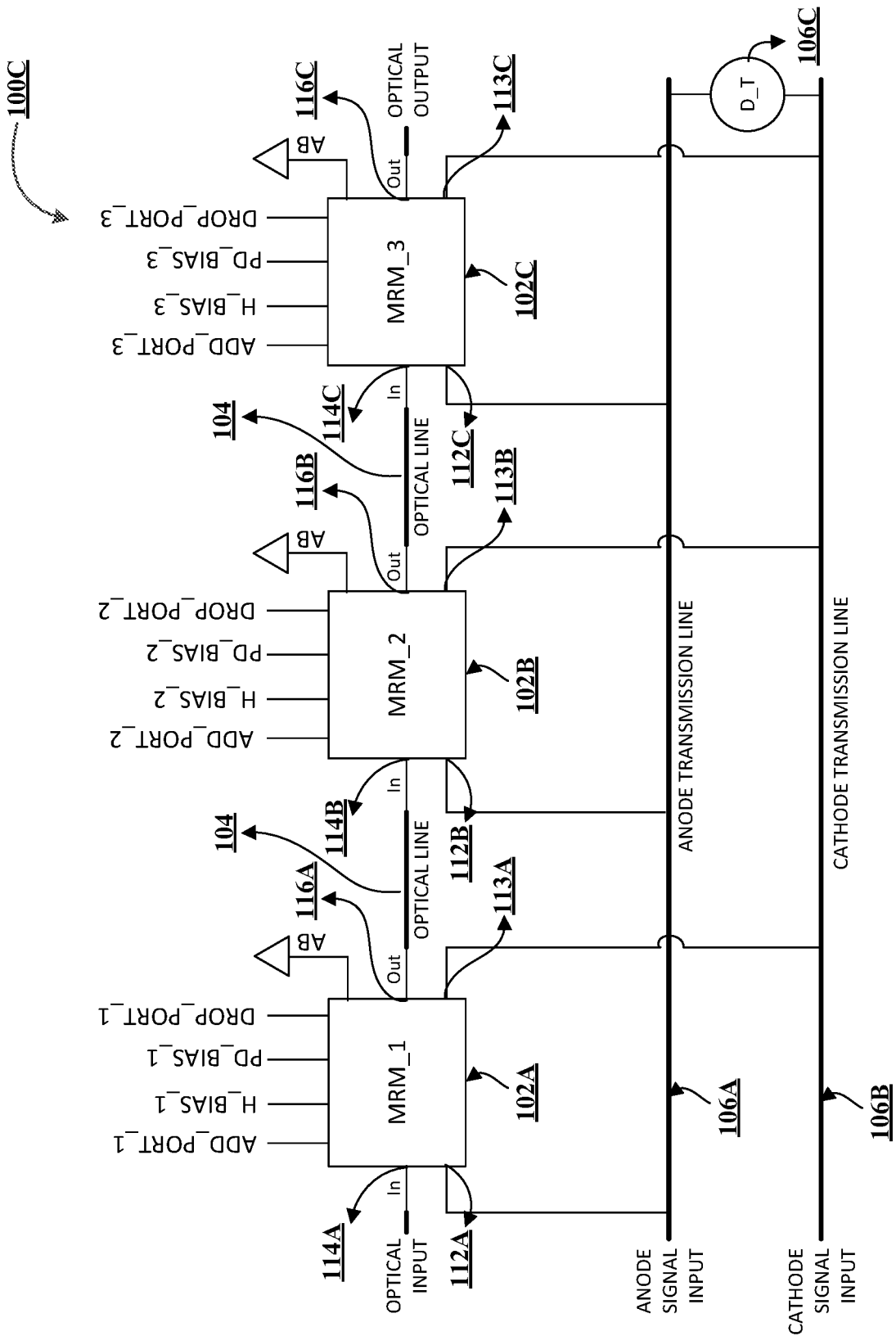

In some example embodiments, as shown in FIGS. 1A-1C, each MRM may include an add port, a drop port, heater bias, a photo detector bias, and an absorber. For example, MRM_1 102A may include an add port ADD_PORT_1, drop port DROP_PORT_1, heater bias H_BIAS_1, photo detector bias PD_BIAS_1, and/or absorber AB. Similarly, MRM_2 102B may include an add port ADD_PORT_2, drop port DROP_PORT_2, heater bias H_BIAS_2, photo detector bias PD_BIAS_2, and/or absorber AB. Still further, MRM_3 102C may include an add port ADD_PORT_3, drop port DROP_PORT_3, heater bias H_BIAS_3, photo detector bias PD_BIAS_3, and/or absorber AB. In some other example embodiments shown in FIGS. 1D, each MRM 102A, 102B, 102C may include only a heater bias, without any add ports, drop ports, or photo detector bias. In particular, MRM_1 102A may include only a heater bias H_BIAS_1, MRM_2 102B may include a heater bias H_BIAS_2, and MRM_3 102C may include a heater bias H_BIAS_3. Although described herein with reference to various ports, heater biases, photo detector biases, and/or absorbers, the present disclosure contemplates that the MRMs 102A, 102B, 102C may include any number of applicable biases, ports, connections, etc. based upon the intended application of the TW-CMRM 100A-100D.

In some example embodiments, as shown in FIGS. 1A-1D, the TW-CMRM 100A-100D may include an optical line 104. When cascaded, MRMs 102A, 102B, 102C may be connected via the optical line 104. For example, the second optical terminal 116A of MRM_1 102A may be connected to the first optical terminal 114B of MRM_2 102B via the optical line 104, and the second optical terminal 116B of MRM_2 102B may be connected to the first optical terminal 114C of MRM_3 102C via the optical line 104. As shown in FIGS. 1A-1D, the first optical terminal 114A of MRM_1 102A may be connected to an optical signal source to receive an optical input signal therefrom. The MRMs 102A, 102B, 102C may be collectively configured to modulate a phase and/or an amplitude of the optical input signal. The modulated optical signal is then transmitted via the second optical terminal 116C of MRM_3 102C to an external circuit operatively coupled with the TW-CWRM 100A-100D.

In example embodiments shown in FIGS. 1A-1D, the TW-CMRM 100A-100D may include an anode transmission line 106A and a cathode transmission line 106B, collectively referred to as an electrical transmission line. The electrical transmission line may be configured to relay an electrical input signal in the form of an anode signal input and a cathode signal input to the MRMs 102A, 102B, 102C via the first electrical terminal 112A, 112B, and 112C, and the second electrical terminal 113A, 113B, and 113C. To this end, the first electrical terminal of each MRM (e.g., first electrical terminal 112A of MRM_1 102A, first electrical terminal 112B or MRM_2 102B, and first electrical terminal 112C of MRM_3 102C) may be operatively coupled to the anode transmission line 106A and configured to receive an anode signal input, and the second electrical terminal of each MRM (e.g., second electrical terminal 113A of MRM_1 102A, second electrical terminal 113B or MRM_2 102B, and second electrical terminal 113C of MRM_3 102C) may be operatively coupled to the cathode transmission line 106B and configured to receive a cathode signal input. When processing the optical input signal, the cascading nature of the MRMs, as shown in FIGS. 1A-ID, may introduce an optical delay in the optical line 104, aggregating as the optical input signal is processed at each MRM stage. Unlike the optical input signal, the electrical input signal may be applied to each MRM in parallel. Therefore, at each MRM stage, the electrical input signal must be delayed proportional to the optical delay at that MRM stage to maintain proper timing.

In some embodiments, the electrical transmission line may have differential termination D_T 106C, i.e., a resister added between the differential pair wires (e.g., anode transmission line 106A and cathode transmission line). In a differential implementation of the TW-CMRM, the electrical transmission line may include a first characteristic impedance differential. In some embodiments, the first characteristic impedance differential may be in a range between approximately 500 and approximately 1000.

In some embodiments, the TW-CMRM 100A-100D may include a level-shifting circuit to translate signals from one logic level or voltage domain to another, allowing compatibility between integrated circuits with different voltage requirements. These level-shifting circuits may include one or more driver circuits configured as a physical interface between a source circuit and a load with specific characteristic requirements. Driver circuits as described herein may have specialized features and capabilities that allow a signal source from a source circuit to drive or impose on the load without negative consequences. Basic functions of a driver circuit may include supplying appropriate voltage levels, sufficient current levels, source and/or sink current as required, provide a voltage and/or current change at a required load rate, and/or the like.

In one example embodiment as shown in FIG. 1A, the driver circuit may include a low frequency (LF) driver circuit. For example, the TW-CMRM 100A in FIG. 1A may include an LF driver circuit 110A operatively coupled between the first electrical terminal 112A of MRM_1 102A and the anode transmission line 106A, an LF driver circuit 110A operatively coupled between the first electrical terminal 112B of MRM_2 102B and the anode transmission line 106A, and/or an LF driver circuit 110A operatively coupled between the first electrical terminal 112C of MRM_3 102C and the anode transmission line 106A. Also, the TW-CMRM may include an LF driver circuit 110B operatively coupled between the second electrical terminal 113A of MRM_1 102A and the cathode transmission line 106B, an LF driver circuit 110B operatively coupled between the second electrical terminal 113B of MRM_2 102B and the cathode transmission line 106B, and/or an LF driver circuit 110B operatively coupled between the second electrical terminal 113C of MRM_3 102C and the cathode transmission line 106B.

In another example embodiment as shown in FIG. 1B, the driver circuit may include an alternating current (AC) driver circuit. In particular, the TW-CMRM 100B in FIG. 1B may include an AC driver circuit 118A operatively coupled between the first electrical terminal 112A of MRM_1 102A and the anode transmission line 106A, an AC driver circuit 118A operatively coupled between the first electrical terminal 112B of MRM_2 102B and the anode transmission line 106A, and/or an AC driver circuit 118A operatively coupled between the first electrical terminal 112C of MRM_3 102C and the anode transmission line 106A. Also, the TW-CMRM 100B may include an AC driver circuit 118B operatively coupled between the second electrical terminal 113A of MRM_1 102A and the cathode transmission line 106B, an AC driver circuit 118B operatively coupled between the second electrical terminal 113B of MRM_2 102B and the cathode transmission line 106B, and/or an AC driver circuit 118B operatively coupled between the second electrical terminal 113C of MRM_3 102C and the cathode transmission line 106B.

Figure 1D:
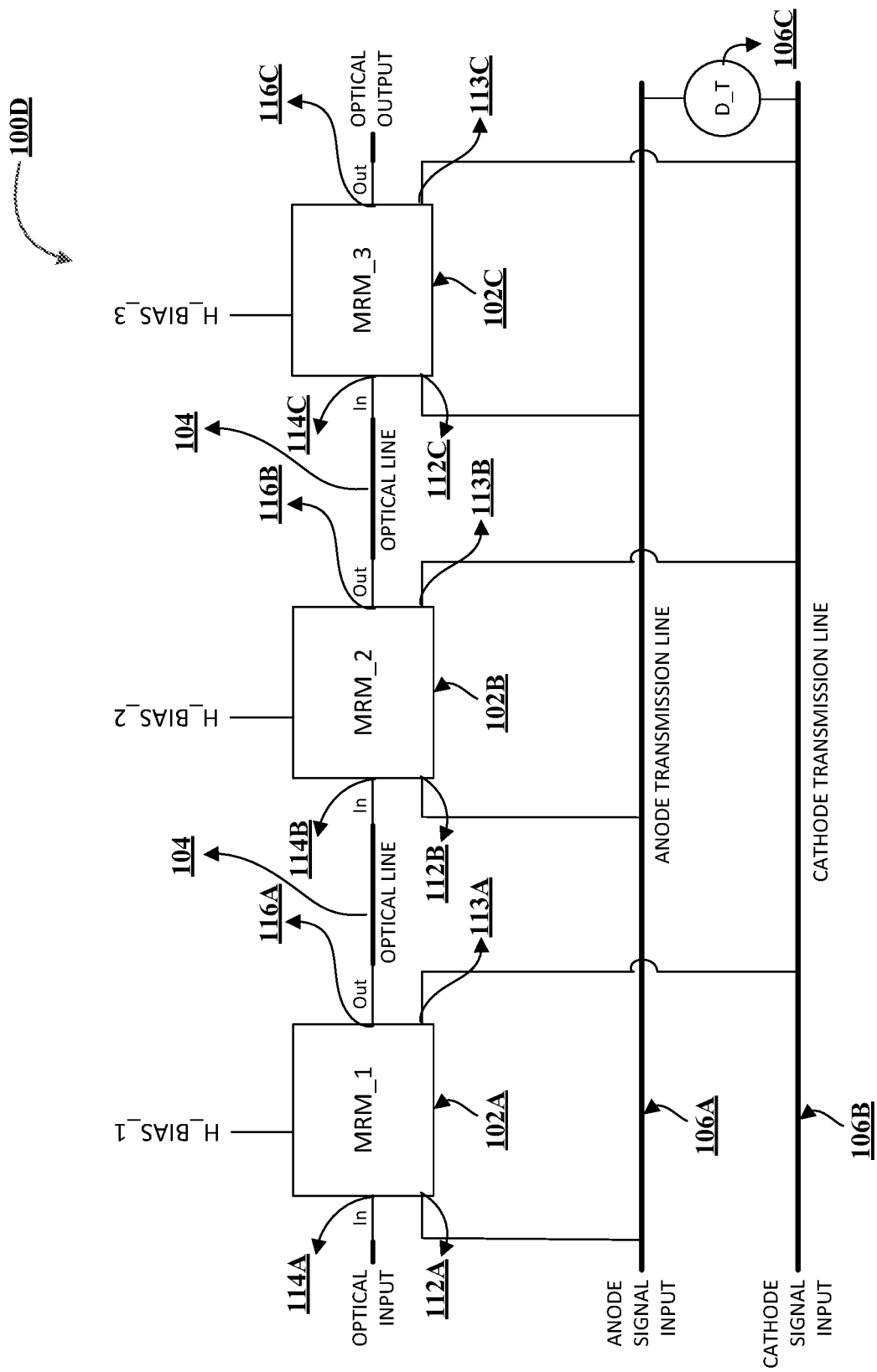

In yet another example embodiment as shown in FIGS. 1C-1D, the driver circuit may include a direct current (DC) driver circuit. In particular, the first electrical terminal 112A of MRM_1 102A, the first electrical terminal 112B of MRM_2 102B, and the first electrical terminal 112C of MRM_3 102C may each be operatively coupled to the anode transmission line 106A, and the second electrical terminal 113A of MRM_1 102A, the second electrical terminal 113B of MRM_2 102B, and the second electrical terminal 113C of MRM_3 102C may each be operatively coupled to the cathode transmission line 106B. Although FIG. 1C illustrates a TW-CMRM 100C that includes a DC driver circuit where each MRM is configured to include add ports, drop ports, heater bias, PD bias, and absorbers, FIG. 1D illustrates a TW-CMRM 100D that includes a DC driver circuit where each MRM is configured without add ports, drop ports, absorber, and PD bias, and includes only heater bias.

With reference to FIGS. 2A-2D a single-ended anode transmission line implementation of a traveling wave cascaded micro ring modulator (TW-CMRM) 150A-D is illustrated. Similar to the TW-CMRM 100A-100D implementations illustrated in FIGS. 1A-ID, the TW-CMRM 150A-150D implementations shown in FIGS. 2A-2D may include MRMs 102A, 102B, 102C, where each MRM may include a first optical terminal, a second optical terminal, a first electrical terminal, and a second electrical terminal. For optical signal transmission through each MRM 102A, 102B, 102C, the first optical terminal may be an input terminal while the second optical terminal may be an output terminal. For electrical signal input, the first electrical terminal and the second electrical terminal may both be input terminals. In some embodiments, the MRMs may be substantially identical to one another. In some other embodiments, the MRMs may not be substantially identical (e.g., at least partially different as described above). The MRMs 102A, 102B, 102C may be cascaded in a series connection such that the output of a first MRM stage is connected to the input of the second MRM stage. In some example embodiments shown in FIGS. 2A-2C, each MRM may include an add port, a drop port, heater bias, a photo detector bias, and an absorber. In some other example embodiments shown in FIG. 2D, each MRM may include only a heater bias, without any add ports, drop ports, or photo detector bias. Furthermore, similar to the TW-CMRM 100A-100D implementations illustrated in FIGS. 1A-ID, the TW-CMRM 150A-150D implementations shown in FIGS. 2A-2D may include an optical line 104, such that, when cascaded, the MRMs 102A, 102B, 102C may be connected via the optical line 104. The first optical terminal 114A of MRM_1 102A may be connected to an optical signal source to receive an optical input signal therefrom, and the modulated optical signal may then transmit via the second optical terminal 116C of MRM_3 102C to any external circuit.

In some example embodiments, as shown in FIGS. 2A-2D, the electrical transmission line in the TW-CMRM 150A-150D may include a first reference voltage line 120A and a cathode transmission line 106B. The electrical transmission line may be configured to relay an electrical input signal in the form of an MRM bias voltage and a cathode signal input to the MRMs 102A, 102B, 102C via the first electrical terminal 112A, 112B, and 112C, and the second electrical terminal 113A, 113B, and 113C. Similar to the TW-CMRM 100A-100D implementations in FIGS. 1A-ID, at each MRM stage, the electrical input signal must be delayed proportional to the optical delay at that MRM stage to maintain proper timing. In some embodiments, the electrical transmission line may have single-ended termination T 122, (i.e., a resister added to the end of the cathode transmission line 106B). In a single-ended implementation of TW-CMRM 150A-150D as shown in FIGS. 2A-2D, the electrical transmission line may include a second characteristic impedance differential. In some embodiments, the second characteristic impedance differential may be in a range between approximately 20Ω and approximately 50Ω.

Figure 2A:
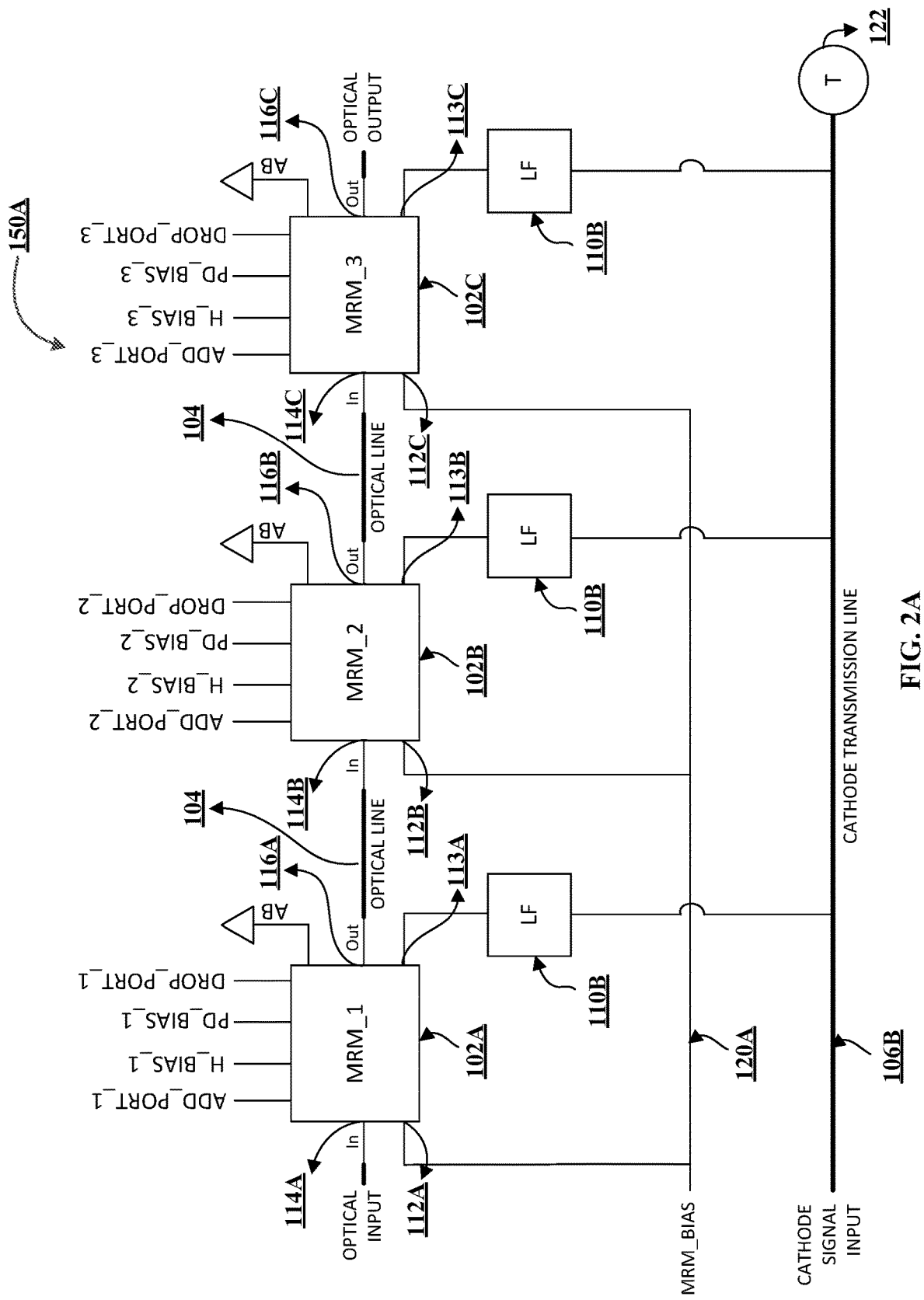
FIGS. 2A-2D illustrate a single-ended anode transmission line implementation of a traveling wave cascaded micro ring modulator (TW-CMRM), in accordance with one or more embodiments of the present disclosure.

Similar to the TW-CMRM 100A-100D implementations in FIGS. 1A-ID, the TW-CMRM 150A-150D implementations shown in FIGS. 2A-2D may include a level-shifting circuit to translate signals from one logic level or voltage domain to another, allowing compatibility between integrated circuits with different voltage requirements. In one example embodiment as shown in FIG. 2A, the driver circuit may include a low frequency (LF) driver circuit. In particular, the TW-CMRM 150A in FIG. 2A may include an LF driver circuit 110B operatively coupled between the second electrical terminal 113A of MRM_1 102A and the cathode transmission line 106B, an LF driver circuit 110B operatively coupled between the second electrical terminal 113B of MRM_2 102B and the cathode transmission line 106B, and an LF driver circuit 110B operatively coupled between the second electrical terminal 113C of MRM_3 102C and the cathode transmission line 106B. Also, the first electrical terminal 112A of MRM_1 102A, the first electrical terminal 112B of MRM_1 102B, and the first electrical terminal 112C of MRM_1 102C are each operatively coupled to the first reference voltage line 120A.

Figure 2B:
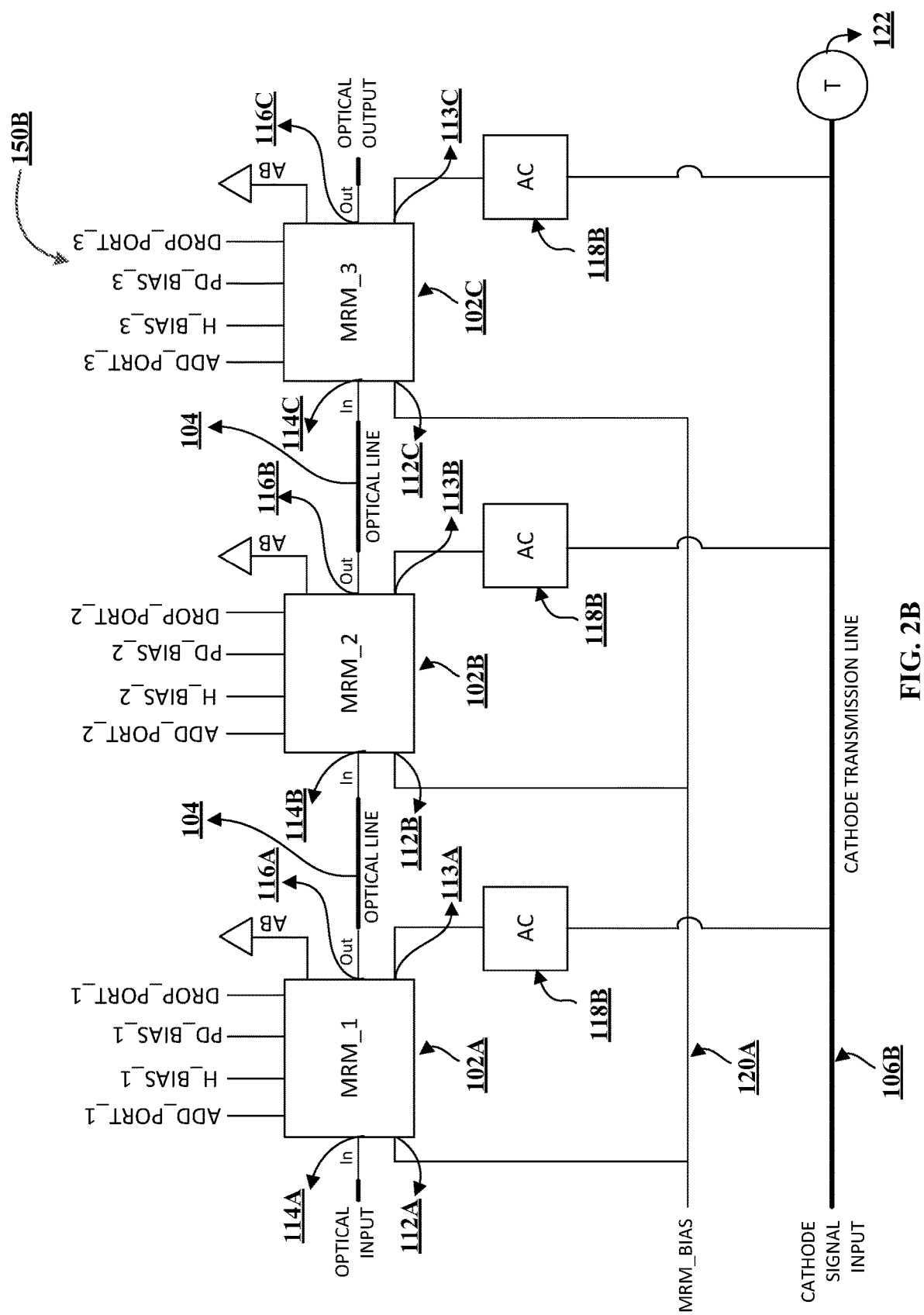

In another example embodiment as shown in FIG. 2B, the driver circuit may include an alternating current (AC) driver circuit. In particular, the TW-CMRM 150B in FIG. 2B may include an AC driver circuit 118B operatively coupled between the second electrical terminal 113A of MRM_1 102A and the cathode transmission line 106B, an AC driver circuit 118B operatively coupled between the second electrical terminal 113B of MRM_2 102B and the cathode transmission line 106B, and/or an AC driver circuit 118B operatively coupled between the second electrical terminal 113C of MRM_3 102C and the cathode transmission line 106B. Also, the first electrical terminal 112A of MRM_1 102A, the first electrical terminal 112B of MRM_1 102B, and the first electrical terminal 112C of MRM_1 102C are each operatively coupled to the first reference voltage line 120A.

Figure 2C:
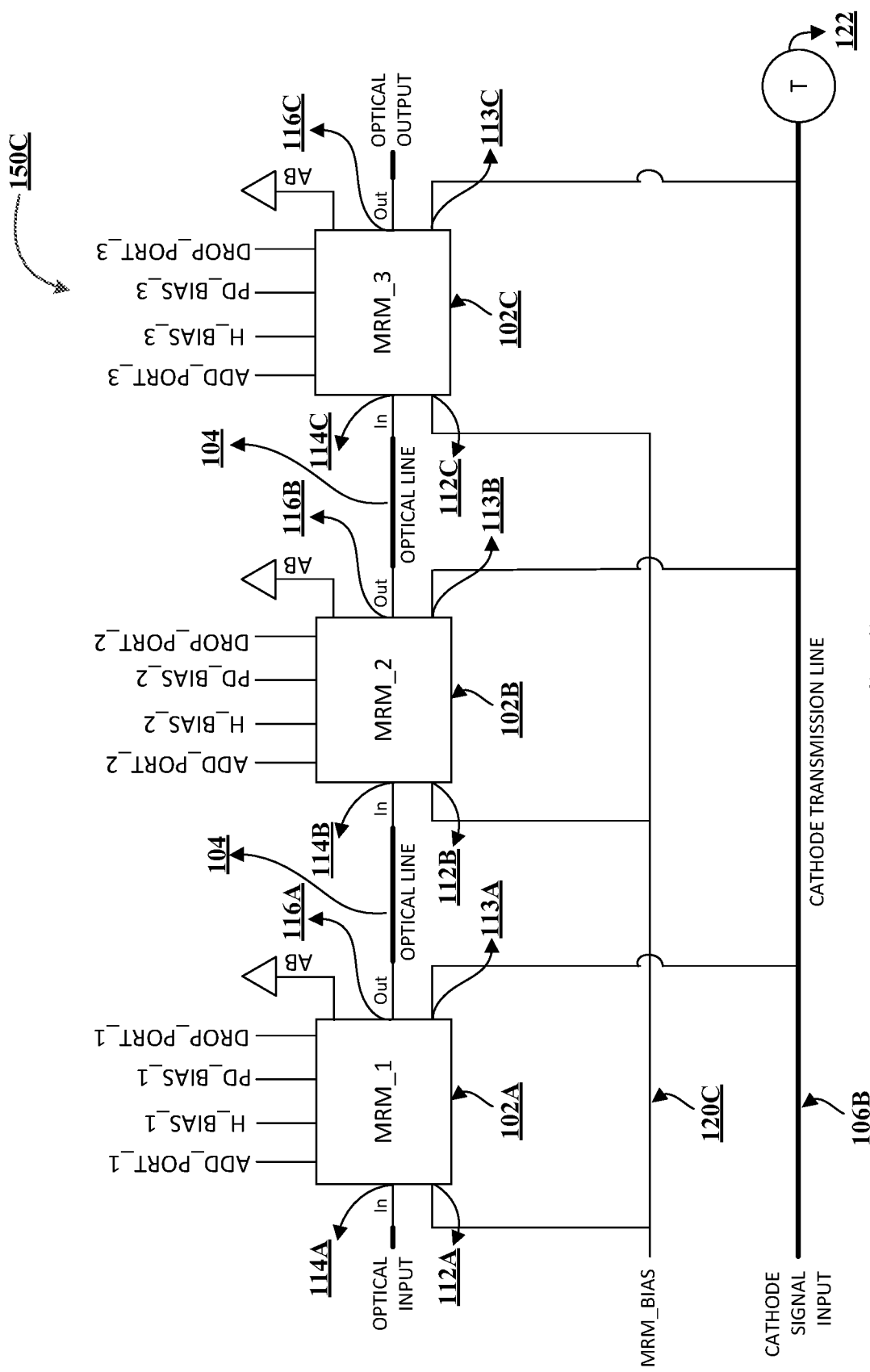
Figure 2D:
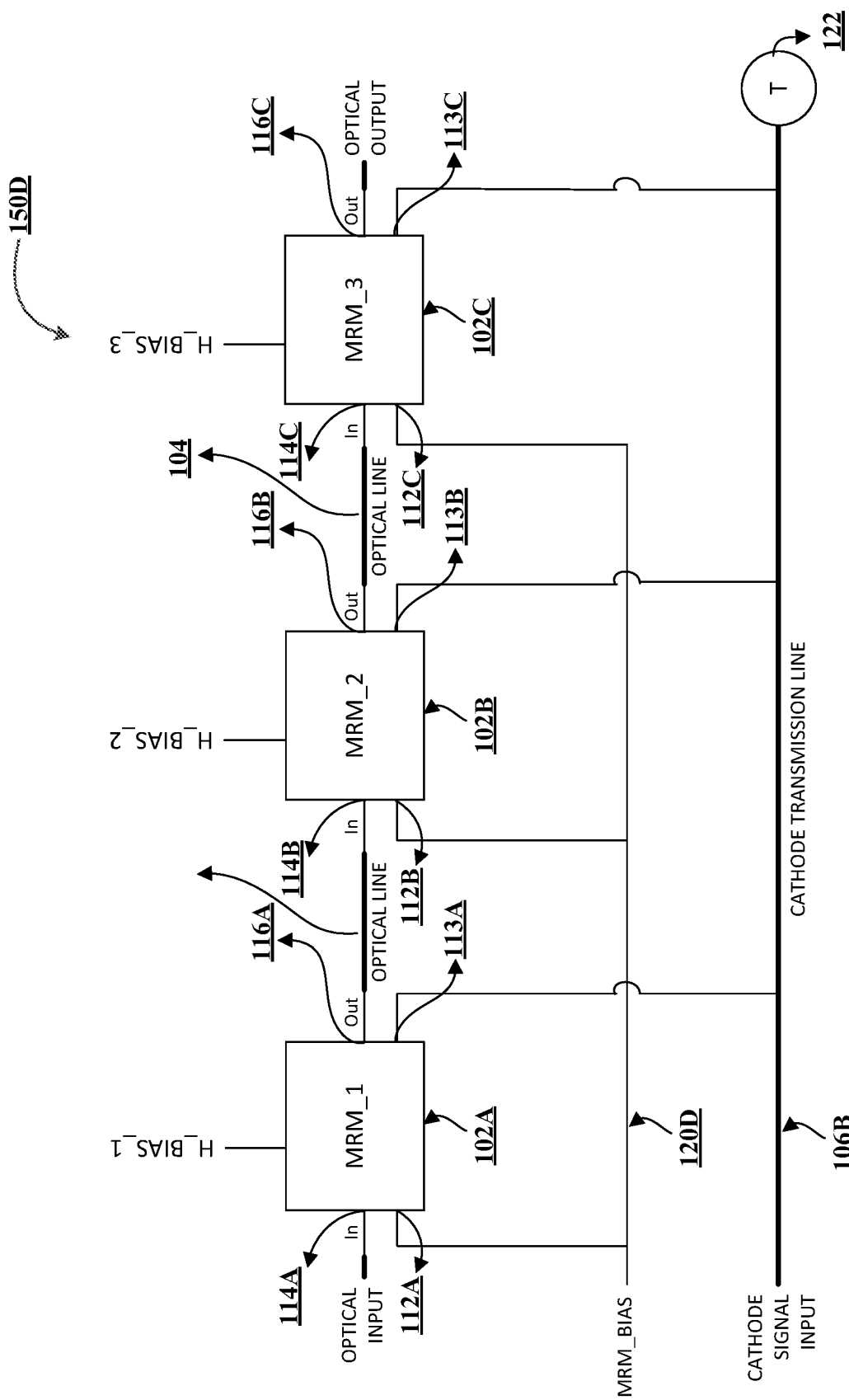

In yet another example embodiment as shown in FIGS. 2C-2D, the driver circuit may include a direct current (DC) driver circuit. In particular, the first electrical terminal 112A of MRM_1 102A, the first electrical terminal 112B of MRM_2 102B, and the first electrical terminal 112C of MRM_3 102C may each be operatively coupled to the first reference voltage line 120A, and the second electrical terminal 113A of MRM_1 102A, the second electrical terminal 113B of MRM_2 102B, and the second electrical terminal 113C of MRM_3 102C may each be operatively coupled to the cathode transmission line 106B. Although FIG. 2C illustrates a TW-CMRM 150C that includes a DC driver circuit where each MRM is configured to include add ports, drop ports, heater bias, PD bias, and absorbers, FIG. 2D illustrates a TW-CMRM 150D that includes a DC driver circuit where each MRM is configured without add ports, drop ports, absorber, and PD bias, and includes only heater bias.

With reference to FIGS. 3A-3D, a single-ended cathode transmission line implementation of a traveling wave cascaded micro ring modulator (TW-CMRM) 175A-D is illustrated. Similar to the TW-CMRM 100A-100D implementations illustrated in FIGS. 1A-ID, the TW-CMRM 175A-175D implementations shown in FIGS. 3A-3D may include MRMs 102A, 102B, 102C, where each MRM may include a first optical terminal, a second optical terminal, a first electrical terminal, and a second electrical terminal. For optical signal transmission through each MRM 102A, 102B, 102C, the first optical terminal may be an input terminal while the second optical terminal may be an output terminal. For electrical signal input, the first electrical terminal and the second electrical terminal may both be input terminals. The MRMs 102A, 102B, 102C may be cascaded in a series connection such that the output of a first MRM stage is connected to the input of the second MRM stage. In some example embodiments shown in FIGS. 2A-2C, each MRM may include an add port, a drop port, heater bias, a photo detector bias, and an absorber. In some other example embodiments shown in FIG. 3D, each MRM may include only a heater bias, without any add ports, drop ports, or photo detector bias. Furthermore, similar to the TW-CMRM 150A-150D implementations illustrated in FIGS. 2A-2D, the TW-CMRM 175A-175D implementations shown in FIGS. 3A-3D may include an optical line 104, such that when cascaded, MRMs 102A, 102B, 102C may be connected via the optical line 104. The first optical terminal 114A of MRM_1 102A may be connected to an optical signal source to receive an optical input signal therefrom, and the modulated optical signal is then transmitted via the second optical terminal 116C of MRM_3 102C to any external circuit.

In example embodiments, as shown in FIGS. 3A-3D, the electrical transmission line in the TW-CMRM 175A-175D may include an anode transmission line 106A and a second reference voltage line 120B. The electrical transmission line may be configured to relay an electrical input signal in the form of an MRM bias voltage and a cathode signal input to the MRMs 102A, 102B, 102C. Similar to the TW-CMRM 100A-100D implementations in FIGS. 1A-ID, at each MRM stage, the electrical input signal must be delayed proportional to the optical delay at that MRM stage to maintain proper timing. In some embodiments, the electrical transmission line may have single-ended termination T 124, (i.e., a resister added to the end of the anode transmission line 106A). In a single-ended implementation of TW-CMRM 175A-175D as shown in FIGS. 3A-3D, the electrical transmission line may include a third characteristic impedance differential. In some embodiments, the third characteristic impedance differential may be in a range between approximately 200 and approximately 500.

Figure 3A:
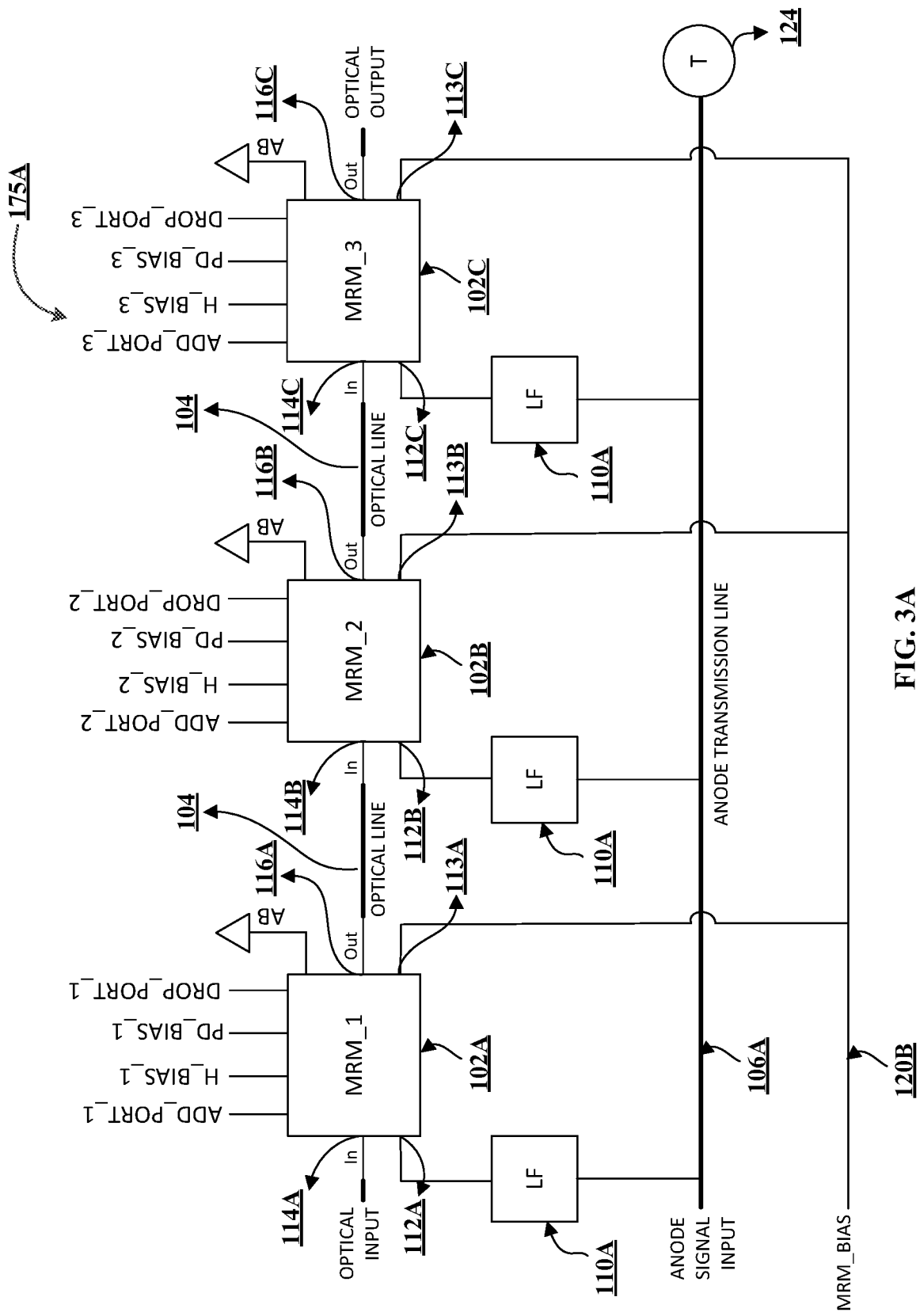
FIGS. 3A-3D illustrate a single-ended cathode transmission line implementation of a traveling wave cascaded micro ring modulator (TW-CMRM), in accordance with one or more embodiments of the present disclosure.

Similar to the TW-CMRM 100A-100D implementations in FIGS. 1A-ID, the TW-CMRM 175A-175D implementations shown in FIGS. 3A-3D may include a level-shifting circuit to translate signals from one logic level or voltage domain to another, allowing compatibility between integrated circuits with different voltage requirements. In one example embodiment as shown in FIG. 3A, the driver circuit may include a low frequency (LF) driver circuit. In particular, the TW-CMRM 175A in FIG. 3A may include an LF driver circuit 110A operatively coupled between the first electrical terminal 112A of MRM_1 102A and the anode transmission line 106A, an LF driver circuit 110A operatively coupled between the first electrical terminal 112B of MRM_2 102B and the anode transmission line 106A, and/or an LF driver circuit 110A operatively coupled between the first electrical terminal 112C of MRM_3 102C and the anode transmission line 106A. Also, the second electrical terminal 113A of MRM_1 102A, the second electrical terminal 113B of MRM_1 102B, and the second electrical terminal 113C of MRM_1 102C are each operatively coupled to the second reference voltage line 120B.

Figure 3B:
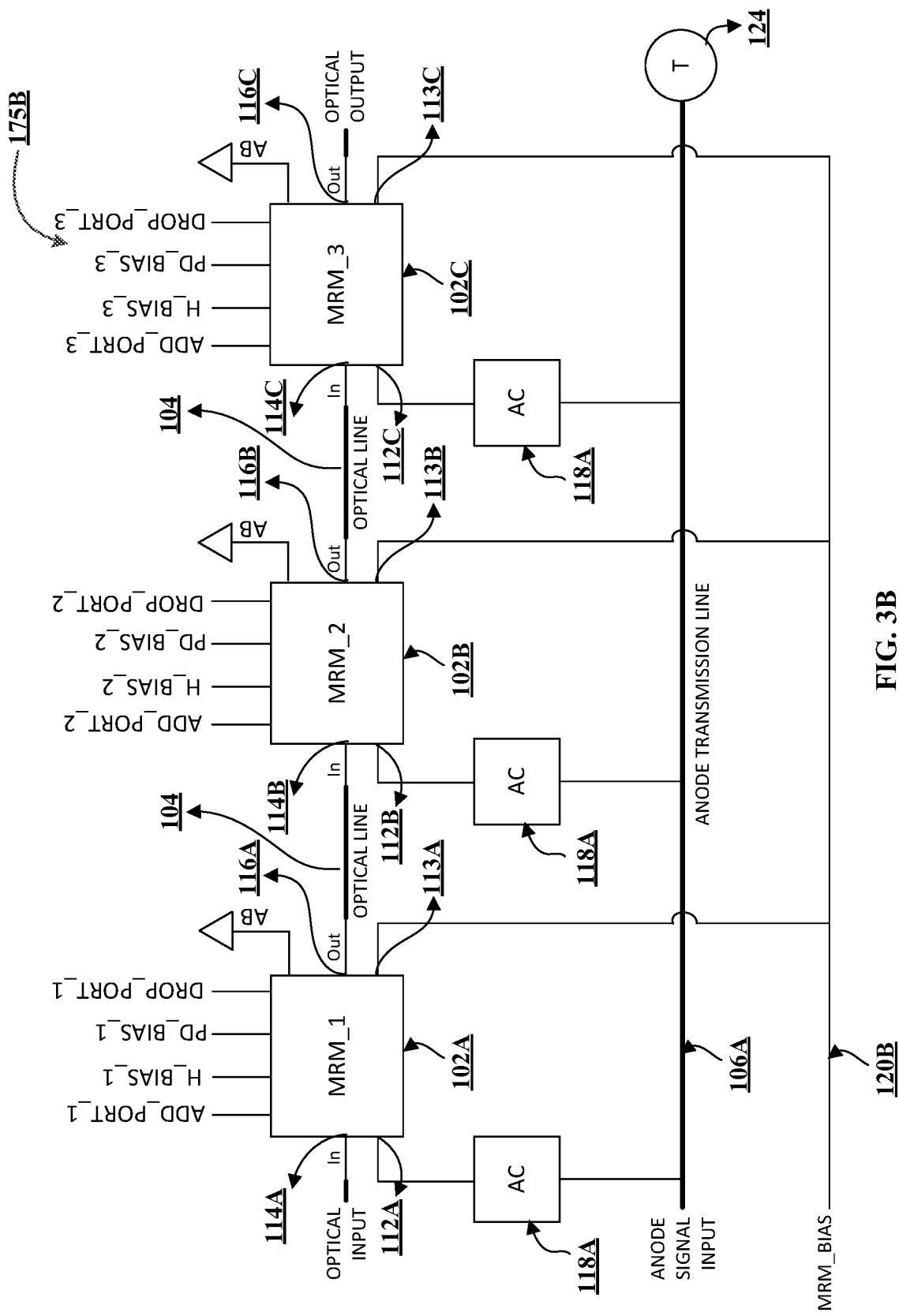

In another example embodiment as shown in FIG. 3B, the driver circuit may include an alternating current (AC) driver circuit. For example, the TW-CMRM 175B in FIG. 3B may include an AC driver circuit 118A operatively coupled between the first electrical terminal 112A of MRM_1 102A and the anode transmission line 106A, an AC driver circuit 118A operatively coupled between the first electrical terminal 112B of MRM_2 102B and the anode transmission line 106A, and/or an AC driver circuit 118A operatively coupled between the first electrical terminal 112C of MRM_3 102C and the anode transmission line 106A.

Figure 3C:
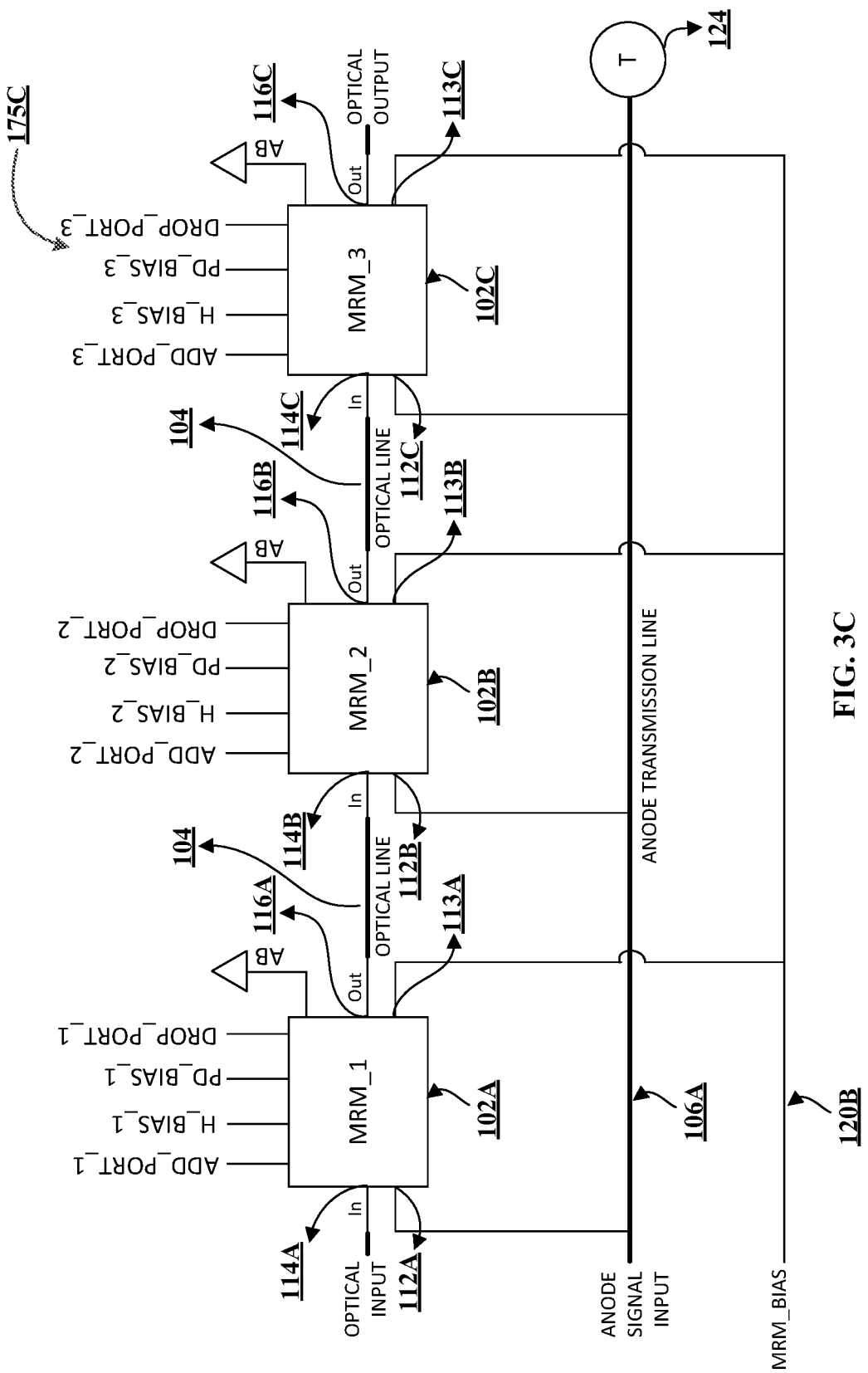
Figure 3D:
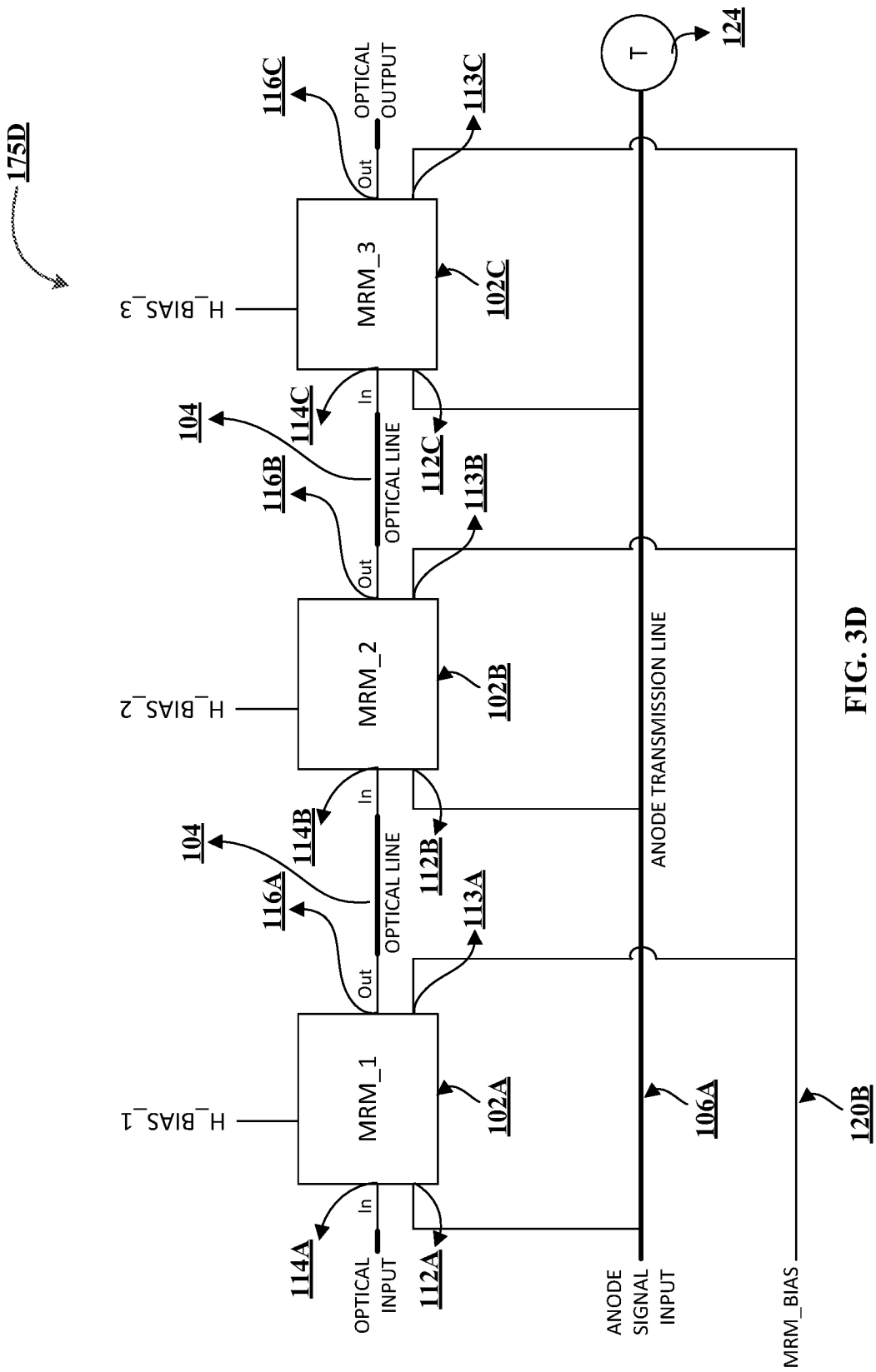

In yet another example embodiment as shown in FIGS. 3C-3D, the driver circuit may include a direct current (DC) driver circuit. In particular, the first electrical terminal 112A of MRM_1 102A, the first electrical terminal 112B of MRM_2 102B, and the first electrical terminal 112C of MRM_3 102C may each be operatively coupled to the anode transmission line 106A, and the second electrical terminal 113A of MRM_1 102A, the second electrical terminal 113B of MRM_2 102B, and the second electrical terminal 113C of MRM_3 102C may each be operatively coupled to the second reference voltage 120B. Although FIG. 3C illustrates a TW-CMRM 175C that includes a DC driver circuit where each MRM is configured to include add ports, drop ports, heater bias, PD bias, and absorbers, FIG. 3D illustrates a TW-CMRM 175D that includes a DC driver circuit where each MRM is configured without add ports, drop ports, absorber, and PD bias, and includes only heater bias.

Figure 4:
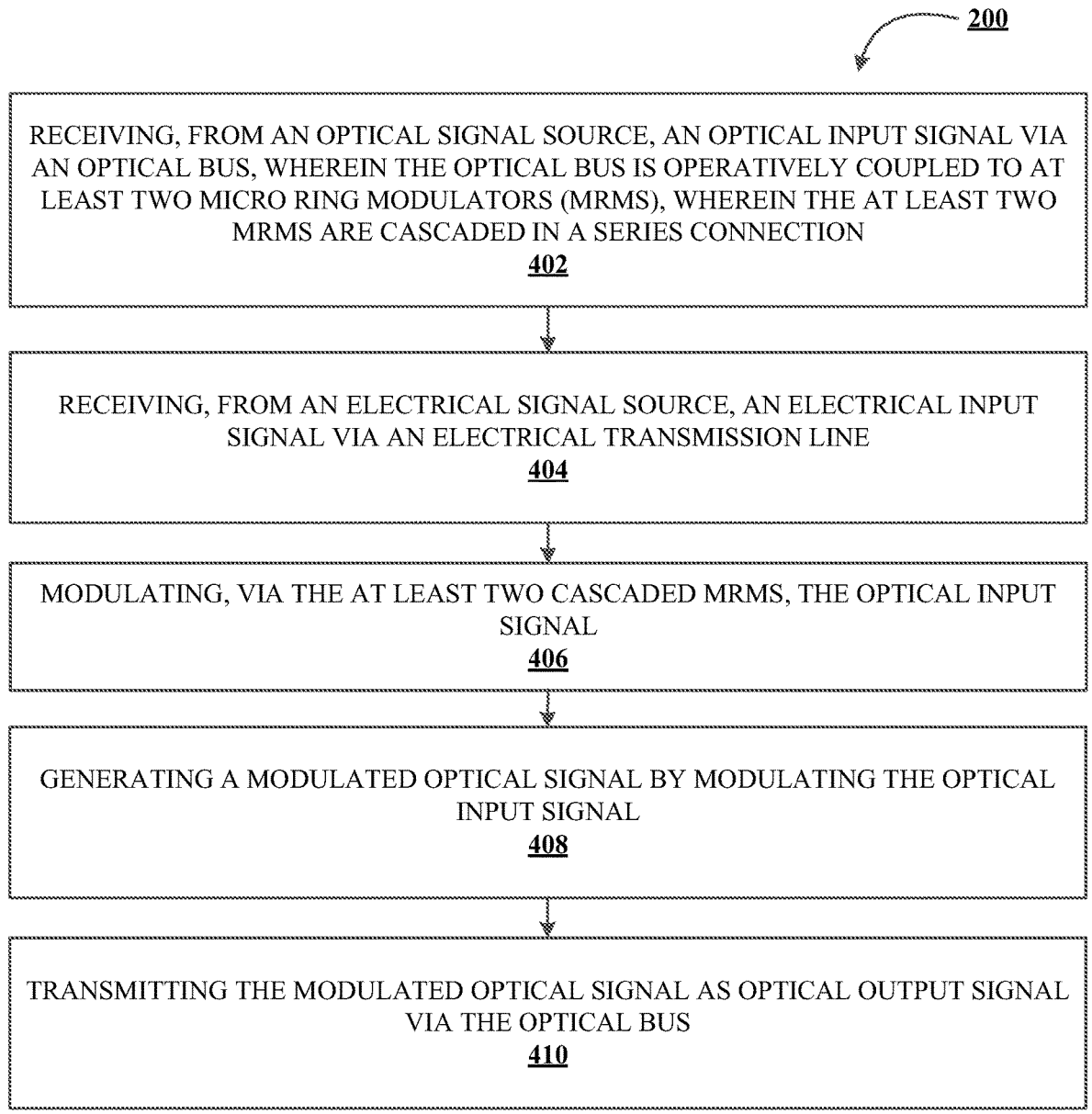
FIG. 4 illustrates an example method for modulating an optical signal using a traveling wave cascaded micro ring modulator (TW-CMRM), in accordance with one or more embodiments of the present disclosure.

With reference to FIG. 4, an example method for modulating an optical signal using a traveling wave cascaded micro ring modulator (TW-CMRM) (e.g., method 200), in accordance with an embodiment of the present disclosure. As shown in block 402, the method may include receiving, from an optical signal source, an optical input signal via an optical bus, wherein the optical bus is operatively coupled to at least two micro ring modulators (MRMs), wherein the at least two MRMs are cascaded in a series connection. As described herein, by cascading the MRMs with one another, the TW-CMRM may achieve increased launch power while maintaining a lower bias and increasing overall modulation efficiency.

Next, as shown in block 404, the method may include receiving, from an electrical signal source, an electrical input signal via an electrical transmission line. In some embodiments, the electrical transmission line may be configured to regulate the electrical input signal by introducing a delay that is proportional to an optical delay associated with the optical bus. As described herein, when processing the optical input signal, the cascading nature of the MRMs may introduce an optical delay in the optical line that aggregates as the optical input signal is processed at each MRM stage. Therefore, at each MRM stage, the electrical input signal must be delayed proportional to the optical delay at that MRM stage to maintain proper timing.

Next, as shown in block 406, the process flow may include modulating, via the at least two cascaded MRMs, the optical input signal. As described herein, the modulation may be an amplitude modulation, a phase modulation, a combination of both amplitude modulation and phase modulation, or any other applicable modulation techniques or combinations thereof. By cascading the MRMs with one another, the TW-CMRM may achieve increased launch power while maintaining a lower bias and increasing overall modulation efficiency.

Next, as shown in block 408, the process flow may include generating a modulated optical signal by modulating the optical input signal. Next, as shown in block 410, the process flow may include transmitting the modulated optical signal as optical output signal via the optical bus.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A traveling wave cascaded micro ring modulator (TW-CMRM) comprising:
   an optical transmission line;
   an electrical transmission line, wherein the electrical transmission line comprises a cathode transmission line and an anode transmission line; and
   at least two micro ring modulators (MRMs) operatively coupled to the optical transmission line and the electrical transmission line, wherein the at least two MRMs are cascaded in a series connection, wherein the at least two cascaded MRMs comprises a first terminal and a second terminal respectively,
   wherein the at least two cascaded MRMs are collectively configured to modulate a phase and/or an amplitude of an optical input signal received from an optical signal source.

2. The modulator of claim 1, wherein the electrical transmission line is configured to relay an electrical input signal to the at least two MRMs.

3. The modulator of claim 2, wherein the electrical transmission line is configured to regulate the electrical input signal by introducing a delay that is proportional to an optical delay associated with the optical transmission line.

4. The modulator of claim 1, wherein the modulator further comprises:
   a level-shifting circuit operatively coupled to the at least two MRMs and the electrical transmission line.

5. The modulator of claim 4, wherein the level-shifting circuit is a direct current (DC) driver circuit.

6. The modulator of claim 4, wherein the level-shifting circuit is an alternating current (AC) driver circuit.

7. The modulator of claim 4, wherein the level-shifting circuit is a low frequency (LF) driver circuit.

8. The modulator of claim 1, wherein the first terminal of the at least two MRMs is operatively coupled to the anode transmission line, and the second terminal of the at least two MRMs is operatively coupled to the cathode transmission line.

9. The modulator of claim 8, wherein the cathode transmission line and the anode transmission line comprise a first characteristic impedance differential therebetween.

10. The modulator of claim 9, wherein the first characteristic impedance is in a range between approximately 500Ω and approximately 1000Ω.

11. The modulator of claim 1, wherein the first terminal of the at least two MRMs is operatively coupled to a first reference voltage, and the second terminal of the at least two MRMs is operatively coupled to the cathode transmission line.

12. The modulator of claim 11, wherein the cathode transmission line and the first reference voltage comprise a second characteristic impedance differential therebetween.

13. The modulator of claim 12, wherein the second characteristic impedance is in a range between approximately 20Ω and approximately 50Ω.

14. The modulator of claim 1, wherein the first terminal of the at least two MRMs is operatively coupled to the anode transmission line, and the second terminal of the at least two MRMs is operatively coupled to a second reference voltage.

15. The modulator of claim 14, wherein the anode transmission line and the second reference voltage comprise a third characteristic impedance differential therebetween.

16. The modulator of claim 15, wherein the third characteristic impedance is in a range between approximately 20Ω and approximately 50Ω.

17. The modulator of claim 1, wherein the at least two MRMs are substantially identical.

18. The modulator of claim 1, wherein the at least two MRMs are not substantially identical.

19. A method for modulating an optical signal using a traveling wave cascaded micro ring modulator (TW-CMRM), the method comprising:
   receiving, from an optical signal source, an optical input signal via an optical transmission line, wherein the optical transmission line is operatively coupled to at least two micro ring modulators (MRMs), wherein the at least two MRMs are cascaded in a series connection;
   receiving, from an electrical signal source, an electrical input signal via an electrical transmission line, wherein the electrical transmission line is configured to regulate the electrical input signal by introducing a delay that is proportional to an optical delay associated with the optical transmission line;

modulating, via the at least two cascaded MRMs, the optical input signal;

generating a modulated optical signal by modulating the optical input signal; and transmitting the modulated optical signal as optical output signal via the optical transmission line.

* * * * *

UNITED STATES PATENT AND TRADEMARK OFFICE
CERTIFICATE OF CORRECTION

PATENT NO. : 12,287,537 B2  
APPLICATION NO. : 17/993296  
DATED : April 29, 2025  
INVENTOR(S) : Anders Svava Mortensen Page 1 of 1

It is certified that error appears in the above-identified patent and that said Letters Patent is hereby corrected as shown below:

In the Claims

In Column 12, Lines 30-32:
Please change the impedance range for Claim 10 to read 50Ω and 100Ω.

Signed and Sealed this  
Third Day of June, 2025

Coke Morgan Stewart  
*Acting Director of the United States Patent and Trademark Office*